(12) United States Patent
Tsuda et al.

(10) Patent No.: US 9,696,595 B2
(45) Date of Patent: Jul. 4, 2017

(54) LIQUID CRYSTAL DISPLAY DEVICE HAVING AN ARRAY SUBSTRATE WITH ELONGATED PROTRUSIONS

(71) Applicant: Japan Display Inc., Minato-ku (JP)

(72) Inventors: Hiroki Tsuda, Minato-ku (JP); Junichi Kobayashi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/155,180

(22) Filed: May 16, 2016

(65) Prior Publication Data

US 2016/0349560 A1 Dec. 1, 2016

(30) Foreign Application Priority Data

May 27, 2015 (JP) ................................. 2015-107534

(51) Int. Cl.
| | |
|---|---|
| *G02F 1/1339* | (2006.01) |
| *G02F 1/1335* | (2006.01) |
| *G02F 1/1337* | (2006.01) |
| *G02F 1/1362* | (2006.01) |
| *G02F 1/1343* | (2006.01) |
| *G02F 1/1333* | (2006.01) |

(52) U.S. Cl.
CPC ........ *G02F 1/13394* (2013.01); *G02F 1/1339* (2013.01); *G02F 1/136286* (2013.01); *G02F 2001/13398* (2013.01); *G02F 2001/133357* (2013.01)

(58) Field of Classification Search
CPC .............. G02F 1/13394; G02F 1/1339; G02F 1/136826; G02F 1/134309; G02F 1/133788; G02F 1/133711; G02F 1/133512
See application file for complete search history.

(56) References Cited

U.S. PATENT DOCUMENTS

| | | | |
|---|---|---|---|
| 2013/0235294 | A1 | 9/2013 | Nomura |
| 2015/0168755 | A1 | 6/2015 | Matsui et al. |

FOREIGN PATENT DOCUMENTS

| | | |
|---|---|---|
| JP | 8-114809 | 5/1996 |
| JP | 2014-95921 | 5/2014 |

*Primary Examiner* — Joseph L Williams
(74) *Attorney, Agent, or Firm* — Oblon, McClelland, Maier & Neustadt, L.L.P.

(57) ABSTRACT

According to one embodiment, a liquid crystal display device includes an array substrate, a counter substrate, a liquid crystal layer, and a sealing material. The array substrate includes signal lines, scanning lines, pixel electrodes, and elongated protrusions. The counter substrate includes counter protuberances and a planarization film. Each of the elongated protrusions of the array substrate extends in such a way as to cover a corresponding one of the signal lines and in a rib-like manner along the corresponding signal line. Each of the counter protuberances of the counter substrate is formed integrally with the planarization film and is formed to extend along a direction intersecting a corresponding one of the elongated protrusions. An outer edge of the planarization film is located nearer to a central portion of the liquid crystal display device than an inner edge of the sealing material.

13 Claims, 6 Drawing Sheets

LIQUID CRYSTAL DISPLAY DEVICE HAVING AN ARRAY SUBSTRATE WITH ELONGATED PROTRUSIONS

CROSS-REFERENCE TO RELATED APPLICATION

This application is based upon and claims the benefit of priority from Japanese Patent Application No. 2015-107534, filed May 27, 2015, the entire contents of which are incorporated herein by reference.

FIELD

Embodiments described herein relate to generally to a liquid crystal display device.

BACKGROUND

In liquid crystal display devices, a planarization film (overcoat) is formed on each of a counter substrate and an array substrate. The planarization film absorbs variations in height occurring due to film formation patterns. More specifically, the planarization film for a counter substrate absorbs differences in thickness between patterns of a black matrix and color filter layers of the respective primary colors. On the other hand, the planarization film formed on an array substrate absorbs variations in height occurring due to wiring patterns or the like.

Furthermore, to keep uniform the thickness of a liquid crystal layer between the counter substrate and the array substrate, a spacer is formed on any one of the counter and array substrates. The spacer is provided after the above-mentioned planarization film is formed.

However, manufacturing the liquid crystal display device configured as mentioned above may require an increased number of manufacturing processes, may allow a substrate to be damaged by the spacer, and may allow moisture to intrude into the liquid crystal display device.

Therefore, embodiments of the invention are directed to providing a liquid crystal display device capable of reducing the required number of manufacturing processes, preventing a substrate from being damaged by a structure provided for the spacer, and preventing moisture from intruding into the liquid crystal display device.

DETAILED DESCRIPTION

According to embodiments, a liquid crystal display device includes an array substrate, a counter substrate, a liquid crystal layer, and a sealing material. The array substrate includes signal lines, scanning lines, and pixel electrodes arrayed in an image display area and further includes elongated protrusions, each of which is made from a resin film. The counter substrate includes counter protuberances, each of which is located to abut on a corresponding one of the elongated protrusions to form a spacer, and a planarization film. The liquid crystal layer is held between the array substrate and the counter substrate. The sealing material is configured to seal the liquid crystal layer. Each of the elongated protrusions of the array substrate extends in such a way as to cover a corresponding one of the signal lines and in a rib-like manner along the corresponding signal line. Each of the counter protuberances of the counter substrate is formed integrally with the planarization film and is formed to extend along a direction intersecting a corresponding one of the elongated protrusions. An outer edge of the planarization film is located nearer to a central portion of the liquid crystal display device than an inner edge of the sealing material.

According to a liquid crystal display device of one embodiment, the required number of manufacturing processes can be reduced, a substrate can be prevented from being damaged by a structure provided for the spacer, and moisture can be prevented from intruding into the liquid crystal display device.

A liquid crystal display device according to one embodiment will be described hereinafter with reference to FIGS. 1 to 5. More specifically, the liquid crystal display device as described hereinafter is of the transverse electric field type called, for example, "in-plane switching (IPS) type, and is, in particular, of the fringe field switching (FFS) type, in which a fringe electric field is used.

Figure 1:
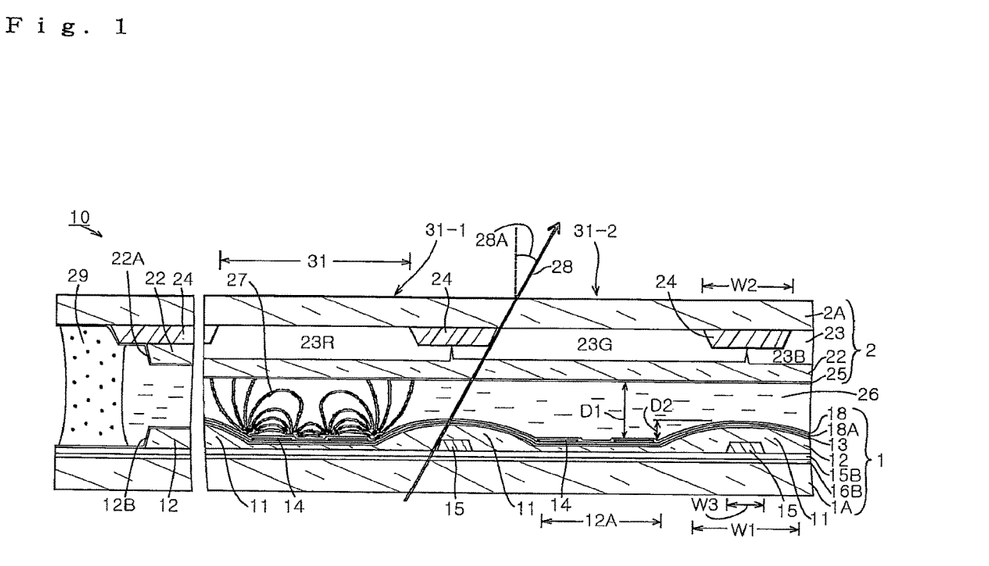
FIG. 1 is a schematic layered sectional view taken along a scanning line direction (a sectional view taken along line I-I in FIGS. 4 and 5), illustrating portions including an elongated protrusion and a pixel aperture, which are main components of a liquid crystal display device according to one embodiment.
Figure 2:
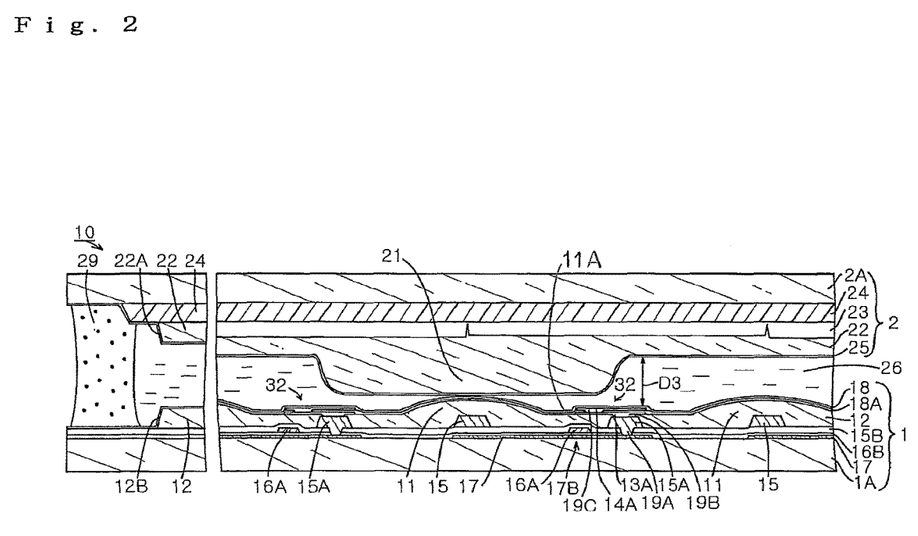
FIG. 2 is a layered sectional view taken along the scanning line direction (a sectional view taken along line II-II in FIGS. 4 and 5), illustrating the position where a counter protuberance is formed.
Figure 3:
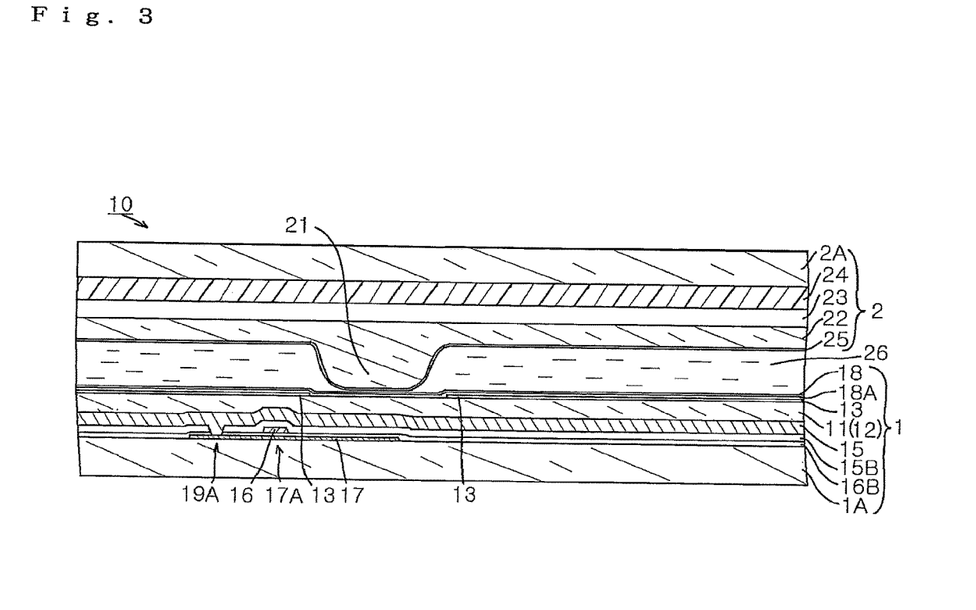
FIG. 3 is a layered sectional view taken along a signal line (a sectional view taken along line III-III" in FIG. 4).

As illustrated in FIGS. 1 to 3, a display panel 10 of the liquid crystal display device includes an array substrate 1, a counter substrate 2, a liquid crystal layer 26, which is held between the array substrate 1 and the counter substrate 2, and a sealing material 29, which is configured to seal the liquid crystal layer 26 by sticking peripheral portions of the array and counter substrates 1 and 2 together.

Figure 4:
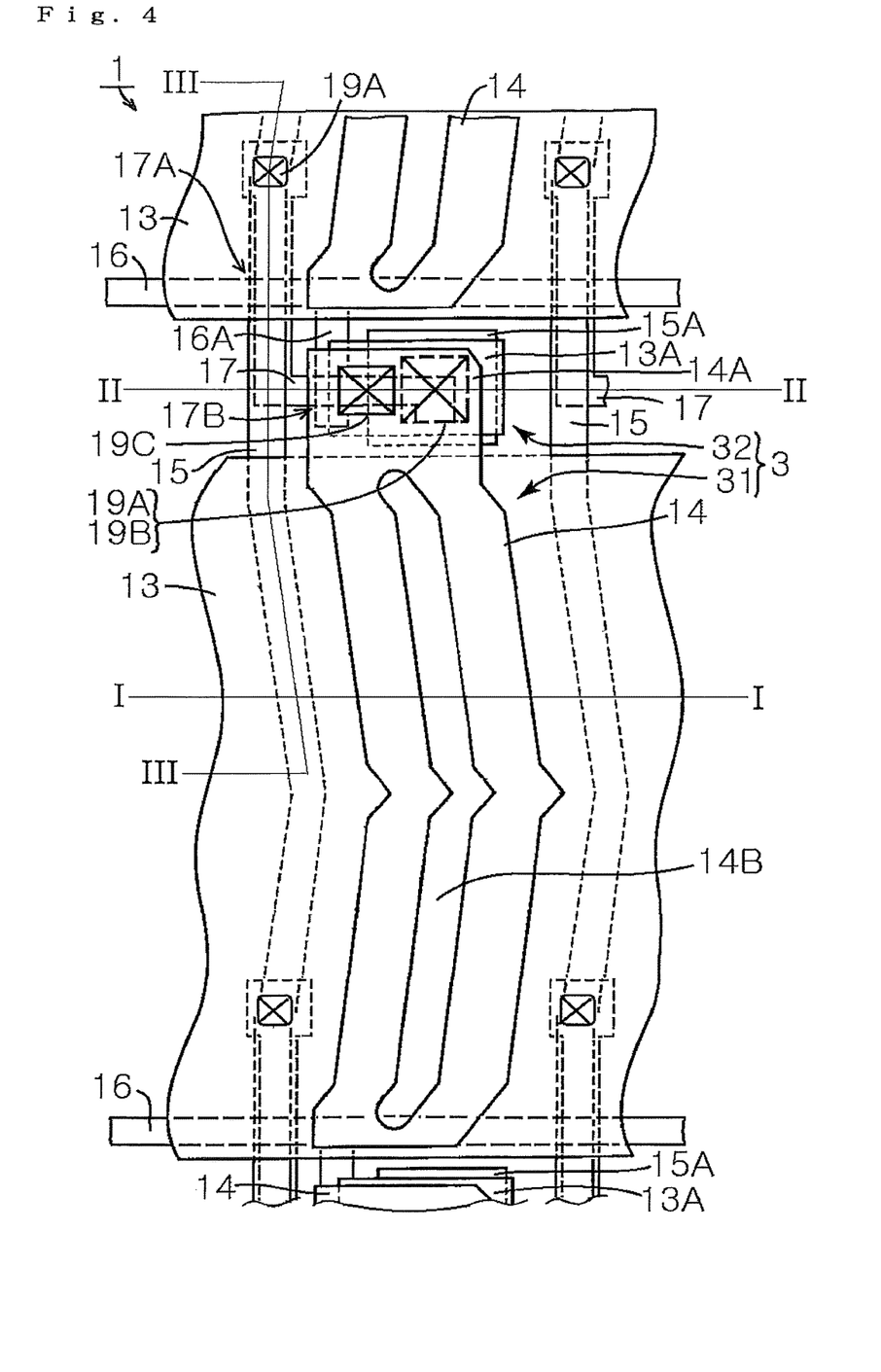
FIG. 4 is a plan view illustrating an example of the basic configuration of a pixel dot in an array substrate.

FIG. 4 illustrates a specific example of the basic configuration of a pixel dot 3 in the array substrate 1. Signal lines 15 and scanning lines 16, which are made from light-blocking metal patterns, are arrayed in a lattice-like manner in the display panel 10. At each intersection point between one of the signal lines 15 and a corresponding one of the scanning lines 16, thin-film transistors (TFTs) 17A and 17B as switching elements and the pixel dot 3, which includes a pixel electrode 14 made from a transparent conductive material, are formed. The pixel electrode 14 and the pixel dot 3 extend lengthwise along the direction of the signal line 15. A major portion of the lengthwise region of the pixel dot 3 corresponds to a pixel aperture 31, in which the pixel electrode 14 is arranged. Furthermore, at one end portion of the pixel dot 3, a switching and conducting portion 32 is formed, in which a pixel electrode extension portion 14A extending from the pixel electrode 14 is arranged.

Figure 5:
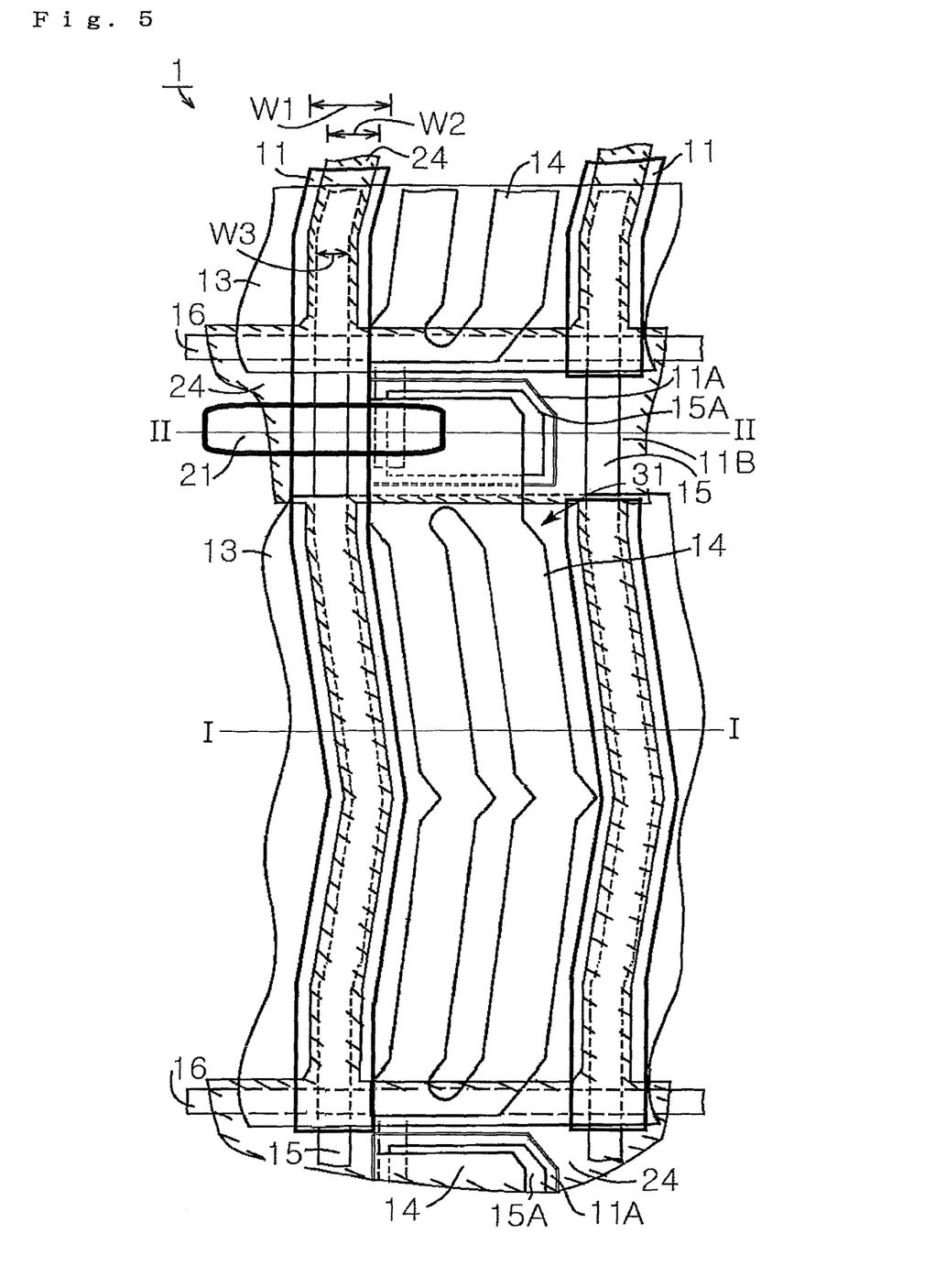
FIG. 5 is a plan view, which is similar to FIG. 4, illustrating an elongated protrusion in an array substrate and a black matrix and a counter protuberance in a counter substrate.

FIG. 5 illustrates a main configuration of the counter substrate 2 in a superimposed manner on the main configuration of the array substrate 1 illustrated in FIG. 4. In the counter substrate 2, a black matrix 24, which is provided in a lattice-like manner with a light-blocking film, is formed of and includes a portion that extends in such a way as to cover the signal line 15 and its vicinity and a portion that covers a corresponding one of the switching and conducting portions 32 and its vicinity. In the example illustrated in FIG. 5, the portion that covers the switching and conducting portions 32 and its vicinity extends continuously along the scanning line 16 and forms a lattice-like shape together with the portion that covers the signal line 15 and its vicinity. Each aperture of the lattice-like shape of the black matrix 24 serves as the pixel aperture 31.

As illustrated in FIGS. 1, 2, and 5, in the array substrate 1, the signal line 15 and its vicinity are covered by the thick portion of a resin film 12, which serves as an elongated protrusion 11. In the example illustrated in FIG. 5, the elongated protrusion 11 is represented by a contour connecting portions having a height equal to ½ the protrusion size D2 (FIG. 1) of the elongated protrusion 11. As illustrated in FIG. 5, in the embodiment, the elongated protrusion 11 is continuously provided on the entirety of each of portions that sandwich the pixel aperture 31, which is lengthwise along the signal line 15, from the right and left sides. However, in the example illustrated in FIG. 5, at a portion that sandwiches the switching and conducting portion 32 with another portion from the right and left sides, the elongated protrusion 11 is omitted except for a spacer portion, which is described later below, so that an interrupted portion 11B, which has no elongated portion, is formed.

On the other hand, at portions other than the peripheral portion of the pixel aperture 31, the resin layer 12 has a relatively small thickness, thus forming an intra-pixel aperture flat portion 12A. In the example illustrated in FIG. 5, almost the entirety of the pixel electrode 14 is arranged on the flat portion 12A. Furthermore, since, at the intra-pixel aperture flat portion 12A, the resin film 12 covers no conductive pattern, the resin film 12 can be omitted.

On the other hand, as illustrated in FIGS. 2, 3, and 5, the counter substrate 2 is provided with a counter protuberance 21, which is formed integrally with a planarization film 22 during formation of the planarization film 22 with a resin. In a specific example illustrated in the plan view of FIG. 5, the counter protuberance 21 is in the shape of a rectangle with round corners and lengthwise in the scanning line direction. Furthermore, as illustrated in FIGS. 2 and 3, an apical portion of the counter protuberance 21 and an apical portion of the elongated protrusion 11, which extends in the signal line direction, are located to abut on each other, thus serving as a spacer (photo spacer). Here, in particular, one elongated protrusion 11, which extends along the signal line 15, and one counter protuberance 21, which is lengthwise along the direction of the scanning line 16, are combined in a cross-like manner, thus forming one spacer portion.

The spacer portion as formed in the above-described way can be provided one for a plurality of pixel dots, and, for example, can be provided one for four pixel dots or one for eight pixel dots. In the example illustrated in FIG. 5, the counter protuberance 21 is located only in the vicinity of one corner of a rectangular pixel dot depicted at the center of the figure.

In this way, since the elongated protrusion 11, which extends in the signal line direction, and the counter protuberance 21, which extends in the scanning line direction, are located to abut on each other in a cross-like manner as viewed in the plan view of FIG. 5, there is no possibility that a protuberance of one substrate abuts on and damages a portion other than a protuberance of the other substrate.

Furthermore, since the counter protuberance 21 is formed simultaneously and integrally with the planarization film 22 and can have a significantly smaller protrusion size than the thickness of the liquid crystal layer 26, the process burden can be reduced.

In the example illustrated in FIG. 5, the contour shape of the counter protuberance 21 in plan view has been described as being of a rectangular shape, but can be of an elliptical shape or oval shape or can be of another shape. Furthermore, in FIG. 5, the length of the counter protuberance 21 is depicted as being approximately equal to the width of the pixel aperture 31, but can be, for example, 0.5 to 2 times the width of the pixel aperture 31.

The left-hand end of each of FIGS. 1 and 2 schematically illustrates a layered section of a region including the sealing material 29 and its vicinity. As illustrated in FIGS. 1 and 2, an outer edge 22A of the planarization film 22 is located nearer to a central portion of the liquid crystal display device than an inner edge of the sealing material 29. In particular, the outer edge 22A is away from the inner edge of the sealing material 29 toward the central portion of the liquid crystal display device. Such a location can prevent moisture from intruding into the liquid crystal layer 26 even if deterioration or peeling occurs in the planarization film 22. Furthermore, in a specific example illustrated in FIGS. 1 and 2, an outer edge of the black matrix 24 is located within a region covered by the sealing material 29. Moreover, an outer edge 12B of the resin layer 12 of the array substrate 1 is also located away from the inner edge of the sealing material 29 at a position nearer to the central portion of the liquid crystal display device than the inner edge of the sealing material 29.

On the other hand, as illustrated in FIGS. 1 to 3, alignment films 18 and 25 are respectively formed on the surfaces contacting the liquid crystal layer 26, in the array substrate 1 and the counter substrate 2. In the counter substrate 2, the alignment film 25 is formed on the surface of the planarization film 22 and the counter protuberance 21. The alignment films 18 and 25 have a structure to align liquid crystal molecules, which is implemented, in one embodiment, by irradiation with light, such as ultraviolet ray, rather than rubbing processing, and is thus obtained by a photo-alignment technique. The light used for such an irradiation includes, for example, ultraviolet rays of 200 to 450 nm, and is desirably mainly light with wavelengths of 254 to 400 nm. Although the photo-alignment processing may deteriorate the planarization film 22, since the planarization film 22 does not exist at a position overlapping the sealing material 29, as illustrated in the left-hand end of each of FIGS. 1 and 2, there is no possibility that the sealing property for preventing intrusion of moisture becomes impaired. Additionally, the alignment films 18 and 25 can be formed integrally with the planarization film 22 or the resin film 12.

FIG. 1 schematically illustrates a layered sectional view of a portion including the pixel aperture 31 in a direction along the scanning line 16, in other words, in a direction approximately perpendicular to the signal line 15. As illustrated in FIG. 1, first, in the vicinity of the signal line 15, since the thickness of the resin layer 12 is made larger by providing the elongated protrusion 11, the signal line 15 can be surely covered and insulated and an undesired parasitic capacitance occurring between the signal line 15 and a conductive layer on the resin layer 12 can be made sufficiently small. Furthermore, at the same time, since the pixel electrode 14 is arranged approximately at the intra-pixel aperture flat portion 12A, the thickness of the liquid crystal layer 26 in a portion proximate to the pixel electrode 14 can be set to a predetermined uniform dimension D1, which is larger than the dimension in a portion proximate to the elongated protrusion 11. In other words, the thickness of the liquid crystal layer 26 in a region near the signal line 15, which serves as a partition between the pixel dots 3, can be made smaller than the predetermined dimension D1 in a portion proximate to the pixel electrode 14.

Furthermore, in most liquid crystal display devices, in a case where a display panel is viewed from an oblique direction (in a case where the view angle is large), the edge portion of a pixel dot may receive mixture of light leaking from an adjoining pixel dot. For example, the edge portion of a red pixel dot may receive "color mixture", which is mixture of green light leaking from an adjoining green pixel dot. In many cases, it is possible to decrease the liquid crystal modulation rate by reducing the thickness of a liquid crystal layer. Therefore, it is considered that, as the light transmittance in the vicinity of a signal line can be decreased, color mixture can be reduced accordingly.

The thickness of the planarization film 22 is generally 0.5 to 2 μm, and, in one embodiment, the thickness of the planarization film 22 and the maximum thickness of the resin film 12 can be set to 0.5 to 2 μm, for example, 0.8 to 1.2 μm. Furthermore, the thickness of a metal layer constituting the signal line 15 is generally 0.1 to 0.3 μm. Moreover, the thickness of a transparent conductive layer constituting each of the pixel electrode 14 and a common electrode 13 is generally 10 to 30 nm (0.01 to 0.03 μm).

When, as with the embodiment illustrated in FIG. 1, the elongated protrusion 11, which covers the signal line 15, is provided and the thickness of the resin layer 12 is made small in a portion where the pixel electrode 14 is arranged, in a case where the thickness of the liquid crystal layer 26 in a portion proximate to the pixel electrode 14 is set to a given value (D1), the distance in a stacking direction (vertical direction) between the signal line 15, which serves as a light-blocking pattern of the array substrate 1, and the black matrix 24 of the counter substrate 2 can be made small. More specifically, in the case of the embodiment illustrated in FIG. 1, the distance in the vertical direction between the signal line 15 and the black matrix 24 can be made smaller as much as the protrusion size D2 of the elongated protrusion 11, in other words, the difference in height between the elongated protrusion 11 and the intra-pixel aperture flat portion 12A.

In FIG. 1, an oblique passing light ray 28 is depicted, which passes from one pixel aperture 31-1 in the array substrate 1 to an adjoining pixel aperture 31-2 in the counter substrate 2. Additionally, a color mixture critical angle 28A is also depicted, which is a minimum angle that the oblique passing light ray 28 is able to make with the vertical direction. Since different primary colors are assigned between pixel dots adjoining each other across the signal line 15, the oblique passing light ray 28 may cause "color mixture", which is mixture of light rays of different primary colors, at the edge portion of the pixel aperture 31. However, as is seen from FIG. 1, reducing the vertical distance between the signal line 15 and the black matrix 24 enables decreasing the liquid crystal modulation rate so as to increase the color mixture critical angle 28A, thus preventing or reducing color mixture accordingly.

Next, advantageous effects attained by a liquid crystal display device of the transverse electric field type, such as the FFS type, are described.

In the embodiment, in a region of the array substrate 1 in which pixel dots 3 are arrayed, a common electrode 13, which is made from a transparent conductive material, is provided in such a way as to cover almost the whole surface of the region except for the switching and conducting portions 32 and their vicinities. Therefore, the common electrode 13 is provided in such a way as to cover not only the flat portion 12A, on which the pixel electrode 14 is arranged, but also the elongated protrusion 11. Furthermore, in the example illustrated in FIG. 1, the common electrode 13 is provided in such a way as to directly cover the resin layer 12. Moreover, the pixel electrode 14 has a slit 14B. In the example illustrated in FIG. 4, one pixel electrode 14 is provided for each pixel dot 3, and each pixel electrode 14 is provided with one slit 14B, which extends over the entire length of the pixel electrode 14. Additionally, the pixel electrode 14 can be formed of one linear electrode having no slit 14B.

A liquid crystal drive voltage applied between the common electrode 13 and the pixel electrode 14 causes loop-shaped lines of electric force 27 to extend from the array substrate 1, as illustrated in FIG. 1. As schematically illustrated in FIG. 1, the existence of the elongated protrusion 11 prevents or reduces the lines of electric force 27 from spreading to the signal lines 15 located on the right and left sides of the pixel electrode 14.

The specific embodiment illustrated in FIGS. 1 to 5 is described in more detail below.

First, the method for manufacturing the array substrate 1 can be roughly divided into the following processes (1) to (9).

(1) A polysilicon wiring 17 is first formed on a glass substrate 1A of the array substrate 1, and the formed polysilicon wiring 17 is covered by a gate insulating film 16B, which is made of a silicon oxide film or a silicon nitride film.

(2) Then, scanning lines 16 and their branch lines 16A are formed of a metal layer, which is made from, for example, a molybdenum alloy, and the formed scanning lines 16 and branch lines 16A are covered by an inter-layer insulating film 15B, which is made of a silicon oxide film or a silicon nitride film.

(3) A contact hole 19A, which penetrates through the inter-layer insulating film 15B and the gate insulating film 16B and exposes both ends of the polysilicon wiring 17, is formed.

(4) Signal lines 15 and first island-shaped patterns 15A are formed of a metal layer, which is made from aluminum or its alloy, on the inter-layer insulating film 15B.

(5) A transparent resin film 12, which is provided with elongated protrusions 11, is formed, and the signal lines 15 and the first island-shaped patterns 15A are covered by the transparent resin film 12. At this time, a contact hole 19B, which exposes a part of each first island-shaped pattern 15A, is formed.

(6) The layer of a common electrode 13, which is made from a transparent conductive material, such as indium tin oxide (ITO) or indium zinc oxide (IZO), is formed on the resin film 12. At this time, a second island-shaped pattern 13A is formed at the switching and conducting portion 32.

(7) After a common electrode insulating film 18A, which covers the common electrode 13 and other portions, is provided, a contact hole 19C, which exposes a part of the second island-shaped pattern 13A, is formed.

(8) A pixel electrode 14, which is made from a transparent conductive material, such as ITO or IZO, is formed.

(9) Finally, after the resin layer of an alignment film 18 is provided, the photo-alignment processing is performed with irradiation of ultraviolet rays.

Forming the resin film in the above process (5) or the planarization film 22 in a below-described process (iii) can be performed as follows. First, a transparent light curing resin material, which includes, for example, acrylic resin or epoxy resin as a main component, is applied by, for example, a slit-nozzle coater. Then, an exposure operation using a halftone exposure technique is performed while varying the amount of irradiation with ultraviolet rays so as to form a film with a predetermined thickness for each region. Then, after a developing operation for removing any uncured resin material is performed, the resin material is fully cured by heating treatment.

In the specific example illustrated in FIG. 2, in the switching and conducting portion 32, since the first island-shaped pattern 15A, which is formed simultaneously with the signal line 15 and has a relatively large thickness, needs to be covered, the thickness of the resin film 12 in the vicinity of the first island-shaped pattern 15A is made larger than the thickness thereof at the intra-pixel aperture flat portion 12A. In particular, in the example illustrated in FIG. 2, the resin film 12 is formed into a tableland-shaped protuberance 11A at a portion proximate to the switching and conducting portion 32. Therefore, the thickness dimension D3 of the liquid crystal layer 26 at that portion is made smaller than the thickness dimension D1 of the liquid crystal layer 26 at the intra-pixel aperture flat portion 12A.

On the other hand, the method for manufacturing the counter substrate 2 can be roughly divided into the following processes (i) to (iv).
(i) A black matrix 24, which is made of a resin layer containing dispersed black pigment particles or a metal layer, is formed on a glass substrate 2A of the counter substrate 2.
(ii) Then, three types of color filter layers 23R, 23B, and 23G, which are made of resin layers containing dispersed red, blue, and green pigment particles, respectively, are formed in turn.
(iii) A planarization film 22, which covers, for example, the unevenness of thickness between the color filter layers 23R, 23B, and 23G, is formed. At this time, a counter protuberance 21 is formed by the above-mentioned halftone exposure technique at a predetermined portion simultaneously with the planarization film 22.
(iv) Finally, after the resin layer of an alignment film 25 is provided, the photo-alignment processing is performed with irradiation of ultraviolet rays.

The above-described process (iii), which provides the planarization film 22 and the counter protuberance 21 at the counter substrate 2, can be performed in the same way as the above-described process (5), which provides the resin film 12 and the elongated protrusion 11 at the array substrate 1.

The resin materials used in the above-described process (iii), which provides the planarization film 22 at the counter substrate 2, and the above-described process (5), which provides the resin film 12 at the array substrate 1, and the above-described process (9) and the above-described process (iv), which provide the alignment films 18 and 25, respectively, are described in more detail below.

First, it is desirable that the resin material used for the planarization film 22 have a light curing property so as to enable providing the elongated protrusion 11 simultaneously with the planarization film 22. Furthermore, such a resin material is required to have not only an unevenness following property or planarization property, which covers any unevenness (variations in height) to perform planarization, but also a low contamination property to a liquid crystal material (voltage holding property), a high-level transparency, an excellent thermal stability, a high reliability, etc. The resin material that meets these requirements and is low in cost includes, for example, a resin material containing, as a base resin (prepolymer), epoxy acrylate, epoxy novolac, or the like. A cross-linking agent monomer, a sensitizer, etc., are blended into such a base resin.

On the other hand, to enable the photo-alignment processing, a resin material capable of forming a photo-alignment curing film is selected as materials used for the alignment films 18 and 25. Since the alignment films 18 and 25 are only required to be provided on the whole surfaces of the counter substrate 2 and the array substrate 1 and are not required to have an uneven pattern or the like, it is only necessary to use a thermally curable resin material. More specifically, the thermally curable resin material includes, for example, polyimide or polyamide containing a monomer unit having a photo-alignment group, polysiloxane derivative, etc. Here, the photo-alignment group is a compound that enables applying a pretilt angle to a liquid crystal material by performing dimerization or photoisomerization with ultraviolet irradiation, and includes, for example, cinnamate, cinnamoyl, azobenzene, and coumarin. Furthermore, instead of the photo-alignment group as mentioned above, a compound that applies a pretilt angle to a liquid crystal material by a photo-decomposition reaction can be used.

After resin materials for the alignment films 18 and 25 are applied onto substrates and are then cured by heating, photo-alignment processing for irradiating the resin materials with ultraviolet rays from a predetermined direction and angle is performed. In performing ultraviolet irradiation at this time, an ultraviolet light source having a principal peak of wavelength around about 300 nm is typically used to implement, for example, dimerization or photoisomerization. However, such ultraviolet rays may cause deterioration or peeling as mentioned above at the planarization film 22 or the resin film 12. In particular, in a case where a peak of light with a wavelength of 254 nm or a wavelength shorter than 254 nm is large, the carbon-carbon bond, carbon-oxygen bond, etc., of a resin skeleton in the planarization film 22 or the resin film 12 may be cleaved. However, since a cross-linking agent monomer is contained in the planarization film 22 as described above and the degree of cross-linking can be increased in such a way as to reduce a Fourier transform infrared (FT-IR) difference spectrum between before and after the ultraviolet irradiation (for example, using light with a dominant wavelength of 254 nm) in the photo-alignment processing of the planarization film 22, the planarization film 22 can be prevented or reduced from deteriorating during the photo-alignment processing. Furthermore, although, in the above description, the planarization film 22 and the resin film 12 are provided separately from the alignment films 25 and 18, respectively, for example, a photo-alignment property can be given to resin materials for the planarization film 22 and the resin film 12. Thus, even a process for separately forming the alignment films 18 and 25 can be possibly omitted.

Figure 6:
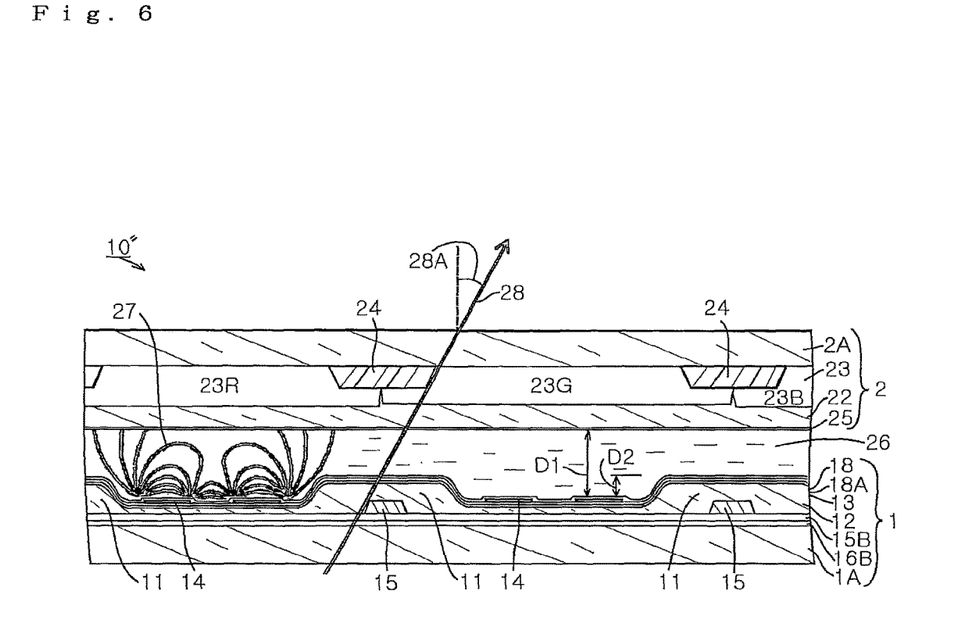
FIG. 6 is a layered sectional view, which corresponds to FIG. 1, illustrating a modification example.

FIG. 6 illustrates, in a layered sectional view similar to FIG. 1, a main portion of a display panel 10" of the liquid crystal display device according to a modification example. The layered cross-sectional shape of the elongated protrusion 11 is a circular arc shape or curvature shape in the embodiment illustrated in FIG. 1, but is a trapezoidal shape or rectangular shape in the modification example illustrated in FIG. 6. Even the modification example illustrated in FIG. 6 can provide an advantageous effect similar to that of the embodiment illustrated in FIG. 1.

According to one embodiment, the protrusion size D2 of the elongated protrusion 11, i.e., the difference in height between the elongated protrusion 11 and the intra-pixel aperture flat portion 12A can be set to 10% to 80%, desirably 15% to 70%, more desirably 1/6 to 4/6, further desirably 1/6 to 2/5, of the thickness D1 of the liquid crystal layer 26 at a portion corresponding to the pixel electrode 14 in the intra-pixel aperture flat portion 12A. For example, the difference in height can be set to 25% to 55%, particularly, 30% to 50%, of the above-mentioned thickness D1. Moreover, the above-mentioned thickness D1 is typically 2 to 5 µm, for example, 2 to 3 µm.

According to one embodiment, in the intra-pixel aperture flat portion 12A of the array substrate 1, the thickness of the resin film 12 can be set to 0.1 to 0.5 µm, particularly, 0.1 to 0.3 µm, or the resin film 12 can be omitted as mentioned above.

According to one embodiment, the width W1 of the elongated protrusion 11 at a height corresponding to ½ of the above-mentioned protrusion size D2 can be set to 0.8 to 1.3 times, for example, 0.9 to 1.2 times, the width W2 of a corresponding linear portion of the black matrix 24, and can be set to 1.5 to 4 times, for example, 2 to 3 times, the width W3 of the signal line 15.

According to one embodiment, the thickness of the resin film 12 in the tableland-shaped protuberance 11A mentioned with reference to FIG. 2 can be set to 1.0 to 5 times, particularly, 1.5 to 3 times, the thickness of the metal layer of each of the signal line 15 and the first island-shaped patterns 15A. Moreover, the difference in thickness of the resin film 12 between the tableland-shaped protuberance 11A and the intra-pixel aperture flat portion 12A, i.e., the difference in height between the tableland-shaped protuberance 11A and the intra-pixel aperture flat portion 12A, can be set to 20% to 80%, for example, 40% to 50%, of the protrusion size D2 of the elongated protrusion 11.

While, in the above-described embodiment and modification example, the liquid crystal display device is of the FFS type, another transverse electric field type of liquid crystal display device can also achieve an effect of preventing color mixture. Furthermore, even in a liquid crystal display device in which a common electrode (counter electrode) is provided at a counter substrate, increasing the color mixture critical angle and decreasing the thickness of a liquid crystal layer in the vicinity of a signal line enable achieving an effect of preventing color mixture.

In the above-described manufacturing processes, in providing the counter protuberance 21 and the planarization film 22 and in providing the elongated protrusion 11 and the resin film at the intra-pixel aperture flat portion 12A, after a resin material is uniformly applied, they are simultaneously and integrally formed by the halftone exposure technique. However, it is considered that, depending on circumstances, the thickness of the resin film can be varied by, for example, an inkjet technique.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   an array substrate including signal lines, scanning lines, and pixel electrodes arrayed in an image display area, and further including elongated protrusions, each of which is made from a resin film;
   a counter substrate including counter protuberances, each of which is located to abut on a corresponding one of the elongated protrusions to form a spacer, and a planarization film;
   a liquid crystal layer held between the array substrate and the counter substrate; and
   a sealing material configured to seal the liquid crystal layer,
   wherein each of the elongated protrusions of the array substrate extends in such a way as to cover a corresponding one of the signal lines and in a rib-like manner along the corresponding signal line,
   each of the counter protuberances of the counter substrate is formed integrally with the planarization film and is formed to extend along a direction intersecting a corresponding one of the elongated protrusions, and
   an outer edge of the planarization film is located nearer to a central portion of the liquid crystal display device than an inner edge of the sealing material.

2. The liquid crystal display device according to claim 1, wherein alignment films formed by photo-alignment processing are provided at the planarization film and the counter protuberances.

3. The liquid crystal display device according to claim 1, wherein the planarization film and the counter protuberances are formed of a transparent light curing resin material, which includes acrylic resin, epoxy resin, or other light curing resin as a main component and contains a cross-linking monomer.

4. The liquid crystal display device according to claim 1, wherein each of the elongated protrusions is provided over an entire portion adjacent along a pixel aperture between the signal lines.

5. The liquid crystal display device according to claim 1, wherein a protrusion size of the elongated protrusions is 1/6 to 4/6 of a thickness of the liquid crystal layer.

6. The liquid crystal display device according to claim 1, further comprising a common electrode provided on the array substrate,
   wherein the common electrode is located nearer to a front surface of the liquid crystal display device than the resin film from which each of the elongated protrusions is made.

7. The liquid crystal display device according to claim 1, wherein a part of the spacer is formed by each of the counter protuberances and a corresponding one of the elongated protrusions being combined in a crossing manner.

8. The liquid crystal display device according to claim 1, wherein a length of each of the counter protuberances is 0.5 to 2 times a width of a pixel apertures between the signal lines.

9. The liquid crystal display device according to claim 1, wherein the planarization film and the counter protuberances are formed by halftone exposure.

10. The liquid crystal display device according to claim 1, wherein the counter substrate further includes a glass substrate, a black matrix, and a color filter layer, and
    the black matrix and the color filter layer are located between the glass substrate and the planarization film.

11. The liquid crystal display device according to claim 1, wherein the array substrate further includes a semiconductor layer, the semiconductor layer has regions in each of which the semiconductor layer intersects the scanning lines at two positions, and each of the counter protuberances overlaps, in plan view, at least one of the regions at which the semiconductor layer intersects the scanning lines.

12. The liquid crystal display device according to claim 1, wherein each of the counter protuberances does not overlap any of the scanning lines.

13. The liquid crystal display device according to claim 1, wherein the planarization film and the counter protuberances contain a cross-linking agent monomer.

* * * * *